UNITED STATES PATENT OFFICE.

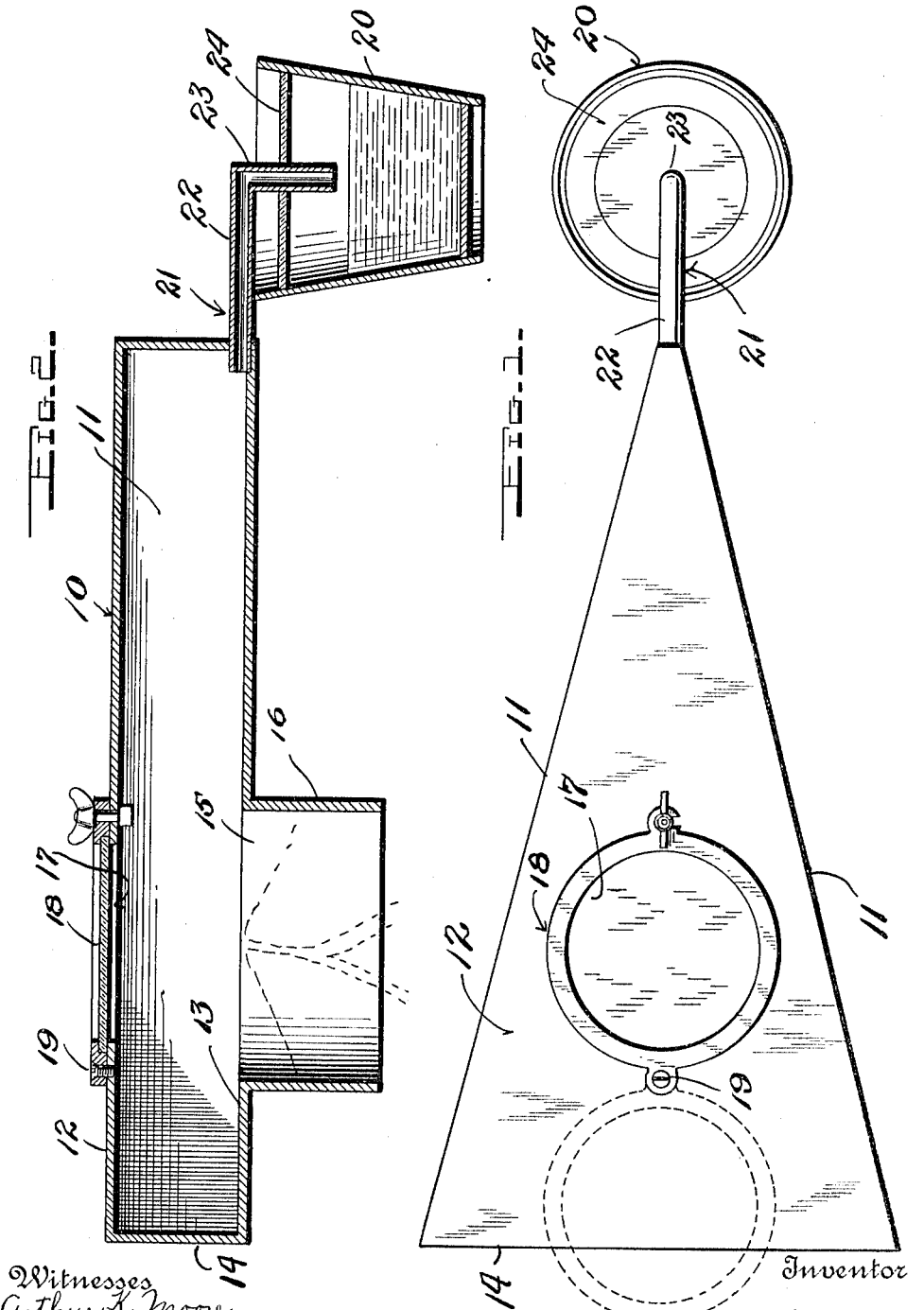

JOHN T. CHANDLER, OF GRANBURY, TEXAS, ASSIGNOR OF ONE-HALF TO JOSEPH L. HARBER, OF GRANBURY, TEXAS.

INSECT-TRAP.

1,073,793.    Specification of Letters Patent.    Patented Sept. 23, 1913.

Application filed January 4, 1913.  Serial No. 740,189.

*To all whom it may concern:*

Be it known that I, JOHN T. CHANDLER, a citizen of the United States, residing at Granbury, in the county of Hood, State of Texas, have invented certain new and useful Improvements in Insect-Traps; and I do hereby declare the following to be a full, clear, and exact description of the invention, such as will enable others skilled in the art to which it appertains to make and use the same.

This invention relates to insect traps and has for an object to provide an ant trap having a novel housing adapted to be embedded in the ground over the ant hill and being of such shape as to concentrate the entrapped ants at one end of the housing, the trap having a normally closed sight opening in the roof to facilitate proper application of the housing to the ant hill.

A further object of the invention is to provide an outlet pipe situated at the constricted end of the housing and adapted to conduct the ants to a bucket preferably containing water for drowning the ants as they drop from the pipe, there being a transparent closure in the mouth of the bucket receiving the pipe and permitting of the contents of the bucket being viewed from above from time to time as desired.

With the above objects in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a plan view of the trap. Fig. 2 is a longitudinal sectional view through the trap applied to an ant hill.

Referring now to the drawing in which like characters of reference designate similar parts, the trap is shown to comprise a substantially triangular housing 10 comprising converging sides 11 connected at the top edges by a cover 12 of triangular outline, and connected at the bottom edges by a bottom 13 which is disposed parallel with the top and is of triangular outline. A rear wall 14 connects the rear edges of the sides, the top and the bottom, the rear wall being substantially oblong in outline and of the same height as the sides. A circular open-ing 15 is formed in the center of the bottom, and around the edges of this opening is disposed a cylindrical flange 16 which is fixed to the bottom face of the housing bottom 13 and extends downwardly below the plane of the bottom edges of the sides 11 and end wall 14. A sight opening 17 is formed in the top, this sight opening being concentric with and of smaller diameter than the above mentioned opening 15. A circular cover 18 forms a closure for this opening, the cover being provided with a pivot pin 19 which extends through the top 12 and permits of the cover being swung back as shown in Fig. 1 to expose the sight opening.

The housing above described is designed to rest on the ground with the cylindrical flange 16 inclosing the ant hill. By virtue of the sight opening 17 in the top of the housing the opening 15 in the bottom of the housing may be exposed so that proper positioning of the housing upon the ant hill will be facilitated. By virtue of the triangular shape of the housing the ants will be directed toward and concentrated at the apex or contracted end of the housing.

For exterminating the entrapped ants, a bucket 20 is designed to be nearly filled with water and embedded in the ground outside of and in close proximity to the apex of the housing. An elbow pipe 21 connects the housing with the bucket, one leg 22 of the pipe extending horizontally and entering the apex of the housing at the bottom 13 as shown in Fig. 2, and the other leg 23 of the pipe projecting through the center of a glass closure 24 disposed in the mouth of the bucket. The ants escape from the housing through the elbow pipe and drop therefrom into the water in the bucket and are drowned. The interior of the bucket may be occasionally viewed through the glass closure 24 for the purpose of determining when sufficient ants have accumulated in the bucket to warrant removal of the bucket for cleaning.

What is claimed, is:—

In an insect trap, a substantially triangular housing including converging sides, a triangular top connecting the top edges of said sides, a triangular bottom parallel with said top and connecting said sides intermediate the top and bottom edges of the latter, an end wall connecting the rear edges of said top, said bottom and said sides, there being a central opening formed in said bottom, a flange on the marginal edges of said opening, said flange depending from the bottom face of said bottom and terminating flush with the bottom edges of said sides and said end wall, a sight opening in said top concentric with said bottom opening, a hinged closure for said sight opening said closure having a glazed center, an outlet pipe entering the apex of said trap near said bottom, the bottom of the opening in the pipe being on a level with that of this housing and exterminating means carried by said pipe.

In testimony whereof, I affix my signature, in the presence of two witnesses.

JOHN T. CHANDLER.

Witnesses:
SID POWELL,
Z. C. MORRISON.

---

Copies of this patent may be obtained for five cents each, by addressing the "Commissioner of Patents, Washington, D. C."